United States Patent
Li et al.

(10) Patent No.: US 11,569,754 B2
(45) Date of Patent: Jan. 31, 2023

(54) SINGLE-PHASE AND THREE-PHASE COMPATIBLE AC-DC CONVERSION CIRCUIT AND METHOD OF CONTROLLING CHARGE AND DISCHARGE THEREOF

(71) Applicant: DELTA ELECTRONICS, INC., Taoyuan (TW)

(72) Inventors: Cheng-Te Li, Taoyuan (TW); Chih-Yuan Chuang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/570,065

(22) Filed: Jan. 6, 2022

(65) Prior Publication Data

US 2022/0416683 A1 Dec. 29, 2022

(30) Foreign Application Priority Data

Jun. 25, 2021 (CN) .................. CN202110710260

(51) Int. Cl.
*H02M 7/217* (2006.01)
*H02M 7/219* (2006.01)
*H02M 1/36* (2007.01)
*H02M 7/04* (2006.01)
*H02M 1/10* (2006.01)

(52) U.S. Cl.
CPC .......... *H02M 7/2173* (2013.01); *H02M 1/10* (2013.01); *H02M 7/05* (2021.05); *H02M 7/2195* (2021.05); *H02M 1/36* (2013.01)

(58) Field of Classification Search
CPC .... H02M 7/2173; H02M 7/2195; H02M 7/05; H02M 1/10; H02M 1/36
See application file for complete search history.

(56) References Cited

U.S. PATENT DOCUMENTS

| | | | |
|---|---|---|---|
| 2010/0080022 A1* | 4/2010 | Schmidt | H02M 7/062 363/53 |
| 2016/0072422 A1* | 3/2016 | Kuroki | H02M 1/36 318/519 |
| 2019/0299793 A1* | 10/2019 | Kim | H02J 7/02 |
| 2020/0083727 A1 | 3/2020 | Sun et al. | |
| 2021/0376754 A1* | 12/2021 | Jang | H02M 1/0054 |

FOREIGN PATENT DOCUMENTS

CN  109861357 A  6/2019

* cited by examiner

*Primary Examiner* — Jue Zhang
(74) *Attorney, Agent, or Firm* — Muncy, Geissler, Olds & Lowe, P.C.

(57) ABSTRACT

A single-phase and three-phase compatible AC-DC conversion circuit includes a first switching component, a second switching component, a third switching component, three switch bridge arms, a fourth switching component, a pre-charge resistor, a capacitor assembly, and a control unit. Each switch bridge arm has an upper switch and a lower switch connected in series. The fourth switching component is coupled between a first phase of a three-phase power source and a common-connected node of the switch bridge arm corresponding to a second phase of the three-phase power source. The control unit turns on the fourth switching component, turns on the upper switch coupled to the first switching component, and turns on the lower switch coupled to the fourth switching component to provide a discharge path so that the capacitor assembly discharges through the pre-charge resistor on the discharge path.

14 Claims, 6 Drawing Sheets

SINGLE-PHASE AND THREE-PHASE COMPATIBLE AC-DC CONVERSION CIRCUIT AND METHOD OF CONTROLLING CHARGE AND DISCHARGE THEREOF

BACKGROUND

Technical Field

The present disclosure relates to an AC-DC conversion circuit and a method of controlling charge and discharge thereof, and more particularly to a single-phase and three-phase compatible AC-DC conversion circuit and a method of controlling charge and discharge thereof.

Description of Related Art

The statements in this section merely provide background information related to the present disclosure and do not necessarily constitute prior art.

In response to changes in the global environment, countries around the world have gradually attached importance to the concept of green energy and environmental protection. With the vigorous development of electrification and intelligent technology in recent years, various car manufacturers have also begun to actively develop electric vehicles (EV) to reduce carbon emissions. For electric vehicles, the on-board charger is the core, which is mainly responsible for transferring charging energy to the high-voltage battery. In addition, due to the continuous development of electric vehicles, the increasing battery mileage, and the increasing requirement of charging power, the original single-phase charger is gradually developed to three-phase charger. Considering that users may encounter different charging conditions, the single-phase and three-phase compatible on-board charger will bring more convenience to users.

However, it should be noted that when the on-board charger stops charging, there is still energy in capacitors of its internal circuits. Considering the operational safety of users and maintenance technicians, it is necessary to provide a discharge path to release this energy. In general, the energy releasing method may be divided into passive discharging and active discharging.

The former (passive discharging) can use the dummy load of the internal circuit of the on-board charger for natural discharge. However, the discharge time will be quite long. The latter (active discharging) can use an additional parallel circuit with a power switch to release the capacitor energy. In this way, the shortest discharge time can be acquired. However, the use of the active discharging method requires additional circuits, which will increase the circuit cost and increase the complexity of circuit control.

SUMMARY

An object of the present disclosure is to provide a single-phase and three-phase compatible AC-DC conversion circuit to solve the existing problems.

In order to achieve to above-mentioned object, the single-phase and three-phase compatible AC-DC conversion circuit disposed between an AC side and a DC side, and the AC side includes a three-phase power source. The AC-DC conversion circuit includes a first switching component, a second switching component, and a third switching component, a switch bridge arm assembly, a fourth switching component, a pre-charge resistor, a capacitor assembly, and a control unit. The switch bridge arm assembly includes three switch bridge arms. Each of the switch bridge arms includes an upper switch and a lower switch connected in series. A plurality of common-connected nodes between the upper switches and the corresponding lower switches are respectively coupled to the three-phase power source through the first switching component, the second switching component, and the third switching component. The fourth switching component is coupled between a first phase of the three-phase power source and the common-connected node of the switch bridge arm corresponding to a second phase of the three-phase power source. The pre-charge resistor is coupled to the first switching component in parallel. The capacitor assembly is coupled to the switch bridge arm assembly in parallel to form the DC side. The control unit turns on the fourth switching component, turns on the upper switch of the switch bridge arm coupled to the first switching component, and turns on the lower switch of the switch bridge arm coupled to the fourth switching component to provide a discharge path so that the capacitor assembly discharges through the pre-charge resistor on the discharge path.

Accordingly, no additional circuit components are required, and only the internal circuit power switching components of the on-board charger are used with pre-charge resistor can realize the function of active discharging. In addition, in order to prevent the large current generated by the power switching component from damaging its own component and the pre-charge resistor, the pulse width modulation (PWM) is introduced to optimize in time and adjust the duty cycle of power switching components, namely, a ratio between turned-on time and turned-off time. Therefore, it not only can effectively reduce the current stress of the power switching components, but also improve the tolerance and system reliability of the power switching components.

Another object of the present disclosure is to provide a method of controlling charge and discharge of a single-phase and three-phase compatible AC-DC conversion circuit to solve the existing problems.

In order to achieve to above-mentioned object, the method of controlling charge and discharge of a single-phase and three-phase compatible AC-DC conversion circuit is provided. The AC-DC conversion circuit receives an AC power source, and the AC-DC conversion circuit includes three switch bridge arms, a fourth switching component, a pre-charge resistor, and a capacitor assembly. Each of the switch bridge arms includes an upper switch and a lower switch connected in series. A plurality of common-connected nodes between the upper switches and the corresponding lower switches are respectively coupled to the AC power source through a first switching component, a second switching component, and a third switching component. The fourth switching component is coupled between a first phase of the three-phase power source and the common-connected node of the switch bridge arm corresponding to a second phase of the three-phase power source. The pre-charge resistor is coupled to the first switching component in parallel. The capacitor assembly is coupled to the three switch bridge arms in parallel. The method includes steps of: (a) charging the capacitor assembly, by the AC power source, in a single-phase manner or a three-phase manner, (b) turning on the fourth switching component when determining that the capacitor assembly is to be discharged, (c) providing a discharge path by turning on the upper switch of the switch bridge arm coupled to the first switching component and turning on the lower switch of the switch bridge arm coupled to the fourth switching component, and (d)

discharging the capacitor assembly through the pre-charge resistor on the discharge path.

Accordingly, no additional circuit components are required, and only the internal circuit power switching components of the on-board charger are used with pre-charge resistor can realize the function of active discharging. In addition, in order to prevent the large current generated by the power switching component from damaging its own component and the pre-charge resistor, the pulse width modulation (PWM) is introduced to optimize in time and adjust the duty cycle of power switching components, namely, a ratio between turned-on time and turned-off time. Therefore, it not only can effectively reduce the current stress of the power switching components, but also improve the tolerance and system reliability of the power switching components.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
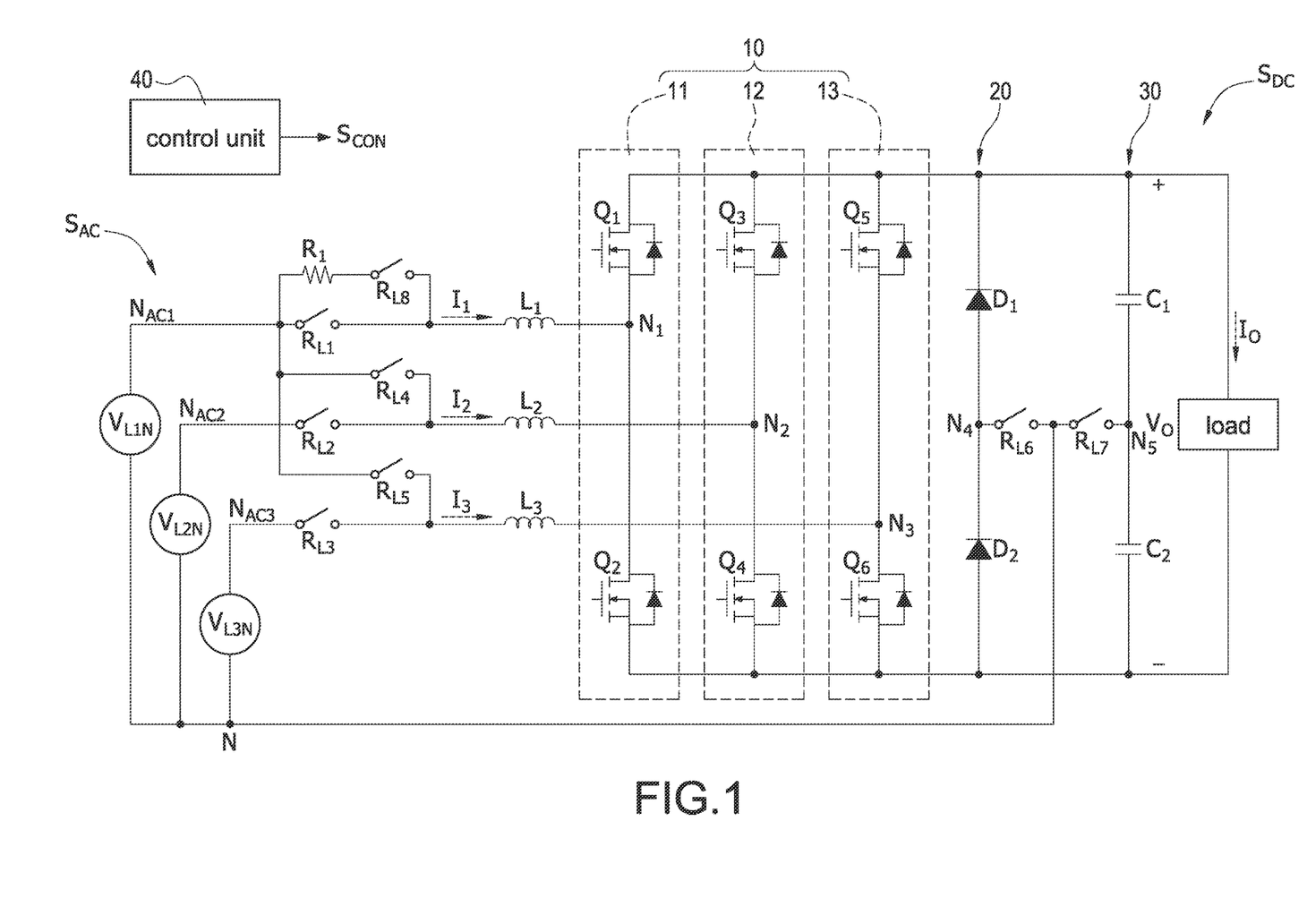
FIG. 1 is a circuit diagram of a single-phase and three-phase compatible AC-DC conversion circuit according to the present disclosure.

Please refer to FIG. 1, which shows a circuit diagram of a single-phase and three-phase compatible AC-DC conversion circuit according to the present disclosure. The AC-DC conversion circuit is disposed between the AC side $S_{AC}$ and the DC side $S_{DC}$. The AC side $S_{AC}$ provides an AC power source, for example a three-phase AC power source or a single-phase AC power source, and the detailed description will be made as follows. In different embodiments, the single-phase and three-phase compatible AC-DC conversion circuit of the present disclosure is, for example but not limited to, a bidirectional AC-DC conversion circuit.

Since the AC side $S_{AC}$ can provide the three-phase AC power source or the single-phase AC power source, the AC side $S_{AC}$ has a first AC node $N_{AC1}$, a second AC node $N_{AC2}$, a third AC node $N_{AC3}$, and a neutral node N. Take the three-phase AC power source as an example, a first phase voltage $V_{L1N}$ of the three-phase AC power source is disposed between the first AC node $N_{AC1}$ and the neutral node N, a second phase voltage $V_{L2N}$ of the three-phase AC power source is disposed between the second AC node $N_{AC2}$ and the neutral node N, and a third phase voltage $V_{L3N}$ of the three-phase AC power source is disposed between the third AC node $N_{AC3}$ and the neutral node N.

The single-phase and three-phase compatible AC-DC conversion circuit includes a switch bridge arm assembly 10, a fourth switching component $RL_4$, a fifth switching component $RL_5$, a pre-charge resistor $R_1$, a diode bridge arm 20, a capacitor assembly 30, and a control unit 40.

The switch bridge arm assembly 10 includes three switch bridge arms connected in parallel, including a first switch bridge arm 11, a second switch bridge arm 12, and a third switch bridge arm 13. The first switch bridge arm 11 includes a first switch $Q_1$ and a second switch $Q_2$ connected at a first node $N_1$, and the first node $N_1$ is coupled to a first AC node $N_{AC1}$ through a first switching component $RL_1$. When the first switching component $RL_1$ is turned on, the first node $N_1$ is coupled to a first phase voltage $V_{L1N}$ through a first phase inductor $L_1$. The second switch bridge arm 12 includes a third switch $Q_3$ and a fourth switch $Q_4$ connected at a second node $N_2$, and the second node $N_2$ is coupled to a second AC node $N_{AC2}$ through a second switching component $RL_2$. When the second switching component $RL_2$ is turned on, the second node $N_2$ is coupled to a second phase voltage $V_{L2N}$ through a second phase inductor $L_2$. The third switch bridge arm 13 includes a fifth switch $Q_5$ and a sixth switch $Q_6$ connected at a third node $N_3$, and the third node $N_3$ is coupled to a third AC node $N_{AC3}$ through a third switching component $RL_3$. When the third switching component $RL_3$ is turned on, the third node $N_3$ is coupled to a third phase voltage $V_{L3N}$ through a third phase inductor $L_3$.

The fourth switching component $RL_4$ is coupled between the first AC node $N_{AC1}$ and the second node $N_2$. That is, when the fourth switching component $RL_4$ is turned on, the fourth switching component $RL_4$ is connected across between a first phase loop and a second phase loop of the three-phase power source. The fifth switching component $RL_5$ is coupled between the first AC node $N_{AC1}$ and the third node $N_3$. That is, when the fifth switching component $RL_5$ is turned on, the fifth switching component $RL_5$ is connected across between the first phase loop and a third phase loop of the three-phase power source. In particular, each of the above-mentioned switching components may be implemented by using a relay.

The pre-charge resistor $R_1$ is coupled to the first switching component $RL_1$ in parallel. When an electric vehicle is charging, the AC-DC conversion circuit converts the three-phase or single-phase AC power source of the AC side $S_{AC}$ to a DC power source outputted at the DC side $S_{DC}$ for charging the electric vehicle. Therefore, the pre-charge resistor $R_1$ is used to suppress a large current, such as an inrush current at the beginning of the charging process, such as when the user starts charging an electric vehicle. In the present disclosure, the pre-charge resistor $R_1$ is used to provide a discharge path for discharging (releasing) the energy stored in the capacitor of the DC side $S_{DC}$ after the high voltage has been charged. Therefore, the pre-charge resistor $R_1$ acts as a discharging resistor during the discharging process. That is, in the discharging operation, no additional circuit components are added, and the existing circuit structure in the pre-charge process is used to discharge the stored energy of the capacitor. The detailed description of the pre-charge resistor $R_1$ will be made hereinafter.

The diode bridge arm 20 is coupled to the switch bridge arm assembly 10 in parallel. In one embodiment, the diode bridge arm 20 includes a first diode $D_1$ and a second diode $D_2$ connected in series at a fourth node $N_4$. In different current-withstanding applications, each diode of the diode bridge arm 20 may also use multiple diodes in parallel, so the diode bridge arm 20 shown in FIG. 1 is not limited.

The capacitor assembly 30 is coupled to the diode bridge arm 20 in parallel to form the DC side $S_{DC}$. In one embodiment, the capacitor assembly 30 includes a first capacitor C1 and a second capacitor $C_2$ connected in series at a fifth node $N_5$. In the application of charging the electric vehicle, the capacitor assembly 30 is used to store the DC power source acquired by converting the three-phase or single-phase AC power source by the AC-DC conversion circuit so that the DC power source outputted from the DC side $S_{DC}$ is used by next stage conversion circuit for charging the battery of the electric vehicle.

The control unit 40 provides control signals $S_{CON}$. Since the switches $Q_1$-$Q_6$ of the switch bridge arms 11,12,13 and the switching components $RL_1$-$RL_8$ are controlled to be turned on and turned off by the control unit 40, the control signals $S_{CON}$ have a plurality of signals for correspondingly controlling the switches $Q_1$-$Q_6$ and the switching components $RL_1$-$RL_8$.

Figure 2:
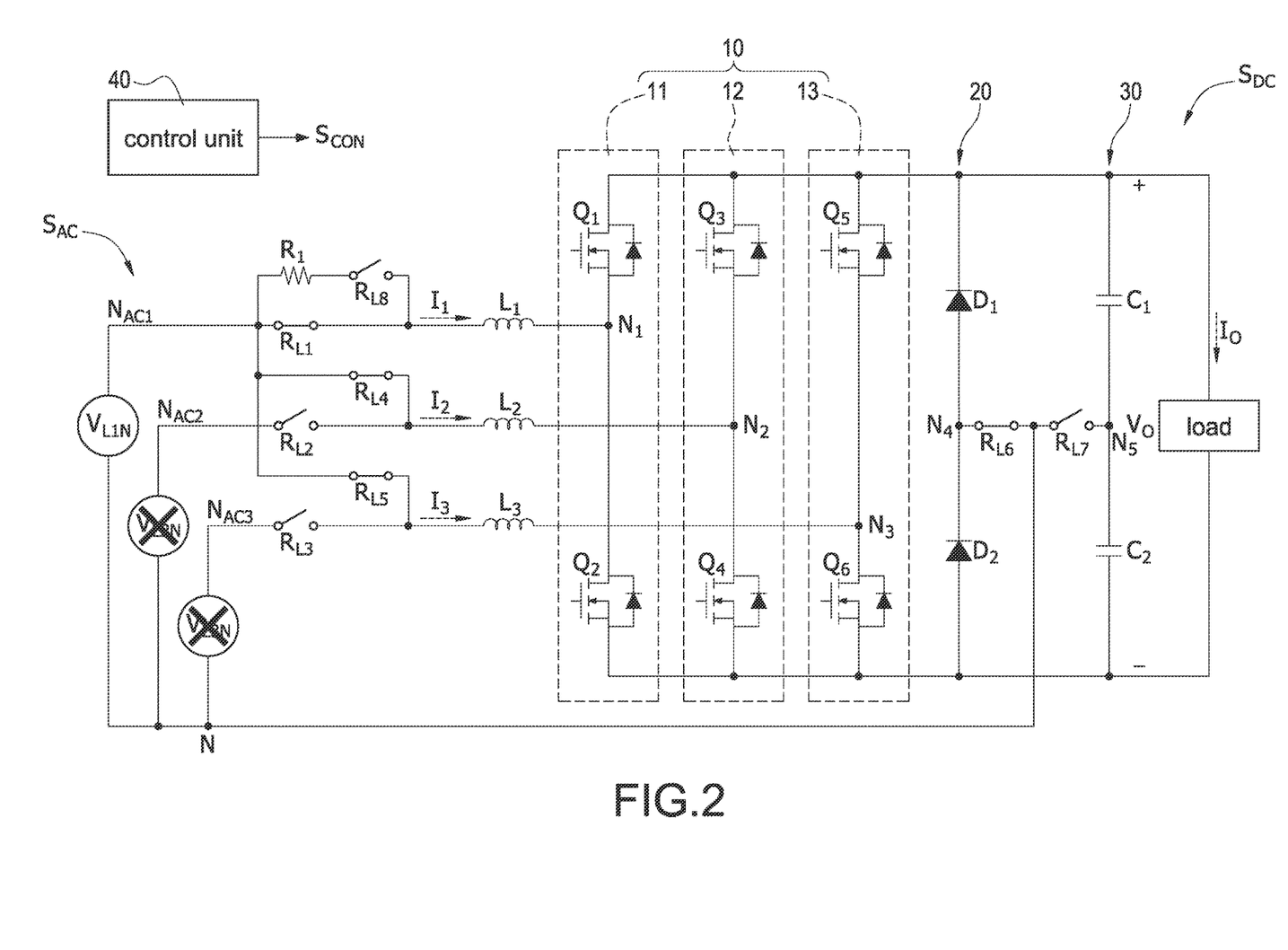
FIG. 2 is a circuit diagram of the single-phase and three-phase compatible AC-DC conversion circuit operating under a single-phase charging according to the present disclosure.

In addition, the single-phase and three-phase compatible AC-DC conversion circuit further includes a sixth switching component $RL_6$ and a seventh switching component $RL_7$. A first end of the sixth switching component $RL_6$ is coupled to the diode bridge arm 20, and a second end of the sixth switching component $RL_6$ is coupled to the seventh switching component $RL_7$ at the neutral node N. In response to the single-phase and three-phase compatible function, the sixth switching component $RL_6$ and the seventh switching component $RL_7$ are respectively used for single-phase and three-phase power supply control. That is, when the AC side $S_{AC}$ is single-phase power supply, the sixth switching component $RL_6$ is controlled to be turned on (refer to FIG. 2), or when the AC side $S_{AC}$ is three-phase power supply, the seventh switching component $RL_7$ is controlled to be turned on (refer to FIG. 3), and the detailed description will be made as follows.

In addition, the single-phase and three-phase compatible AC-DC conversion circuit further includes further an eighth switching component $RL_8$. The eighth switching component $RL_8$ is coupled to the pre-charge resistor $R_1$ in series to form a series-connected structure, and the series-connected structure is coupled to the first switching component $RL_1$ in parallel. By using the eighth switching component $RL_8$, the pre-charge resistor $R_1$ can be reliably disconnected. However, the eighth switching component $RL_8$ may also be omitted.

The technical feature of the present disclosure is that the proposed AC-DC conversion circuit and control method to implement the single-phase and three-phase compatible charging operation, and no additional circuit components are required, and only the internal circuit power switching components of the on-board charger are used with pre-charge resistor $R_1$ can realize the function of active discharging. In addition, in order to prevent the large current generated by the power switching component from damaging its own component and the pre-charge resistor $R_1$, the pulse width modulation (PWM) is introduced to optimize in time and adjust the duty cycle of power switching components, namely, a ratio between turned-on time and turned-off time. Therefore, it not only can effectively reduce the current stress of the power switching components, but also improve the tolerance and system reliability of the power switching components.

When the on-board charger operates, it can be divided into single-phase and three-phase circuit operations according to the conditions of the input terminal of the charging pile. Please refer to FIG. 2, which shows a circuit diagram of the single-phase and three-phase compatible AC-DC conversion circuit operating under a single-phase charging according to the present disclosure. When the AC input is the single-phase voltage, the AC input has only two terminals. Take the first phase voltage $V_{L1N}$ as the supply voltage as an example, the first switching component $RL_1$, the fourth switching component $RL_4$, the fifth switching component $RL_5$, and the sixth switching component $RL_6$ are turned on (the remaining switching components are turned off), and therefore the first phase voltage $V_{L1N}$ passes through the AC-DC conversion circuit, and each switch bridge arm of the switch bridge arm assembly 10 and the diode bridge arm 20 form a totem pole PFC (power factor correction) circuit to transfer energy. Although the AC input is a single-phase voltage, by turning on the fourth switch component $RL_4$ and the fifth switching component $RL_5$, three sets of parallel switching bridge arms of the switch bridge arm assembly 10 (that is, the first switch bridge arm 11, the second switch bridge arm 12, and the third switch bridge arm 13) are commonly coupled to the first phase voltage $V_{L1N}$. The three sets of parallel switch bridge arms all participate in the operation of pulse width modulation (PWM) control, and the parallel bridge arms further operate in the interleaved control, thereby avoiding idle bridge arms and increasing output power. In particular, the fifth switching component $RL_5$ can be omitted depending on the actual power demand. In other words, the third switch bridge arm 13 may not be involved in the operation.

Figure 3:
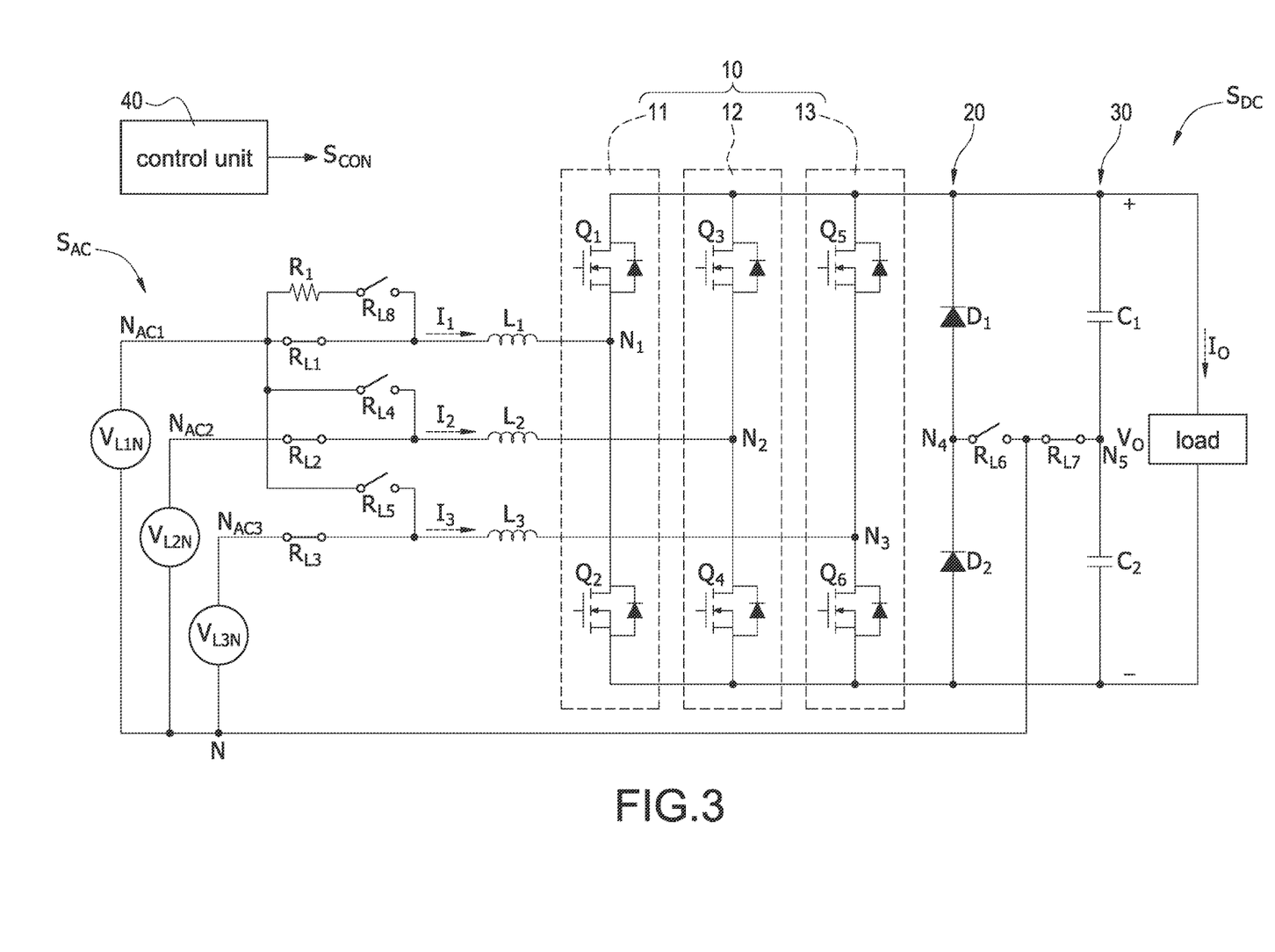
FIG. 3 is a circuit diagram of the single-phase and three-phase compatible AC-DC conversion circuit operating under a three-phase charging according to the present disclosure.

Please refer to FIG. 3, which shows a circuit diagram of the single-phase and three-phase compatible AC-DC conversion circuit operating under a three-phase charging according to the present disclosure. When the AC input is the three-phase voltage, the first switching component $RL_1$, the second switching component $RL_2$, the third switching component $RL_3$, and the seventh switching component $RL_7$ are turned on (the rest of the switching components are turned off). At this condition, the first phase voltage $V_{L1N}$, the second phase voltage $V_{L2N}$, and the third phase voltage $V_{L3N}$ supply power through the AC-DC conversion circuit, and the switch bridge arm assembly 10 and the capacitor assembly 30 form a circuit topology of a half bridge PFC to implement the function of energy transfer.

Regardless of whether the AC input is a single-phase or three-phase circuit operation, when the on-board charger stops charging, the power capacitors (i.e., the first capacitor C1 and the second capacitor $C_2$ of the capacitor assembly 30) still have energy. Due to the consideration of the operational safety of users and maintenance technicians, it is still necessary to provide a discharge path to release this energy. Therefore, the power switching components inside the on-board charger and the pre-charge resistor $R_1$ are used to realize the function of active discharging, and the technical solution of the discharging operation is described according to the following steps.

First, when the on-board charger stops charging, the first phase voltage $V_{L1N}$, the second phase voltage $V_{L2N}$, and the third phase voltage $V_{L3N}$ are in empty connection, and all switching components return to disconnected (turned-off) state, as shown in FIG. 1.

Afterward, in order to establish (build) an energy-releasing part of the power capacitors (i.e., the first capacitor $C_1$ and the second capacitor $C_2$), the eighth switching component $RL_8$ and the fourth switching component $RL_4$ are turned on to wait to start the discharge operation.

Figure 4:
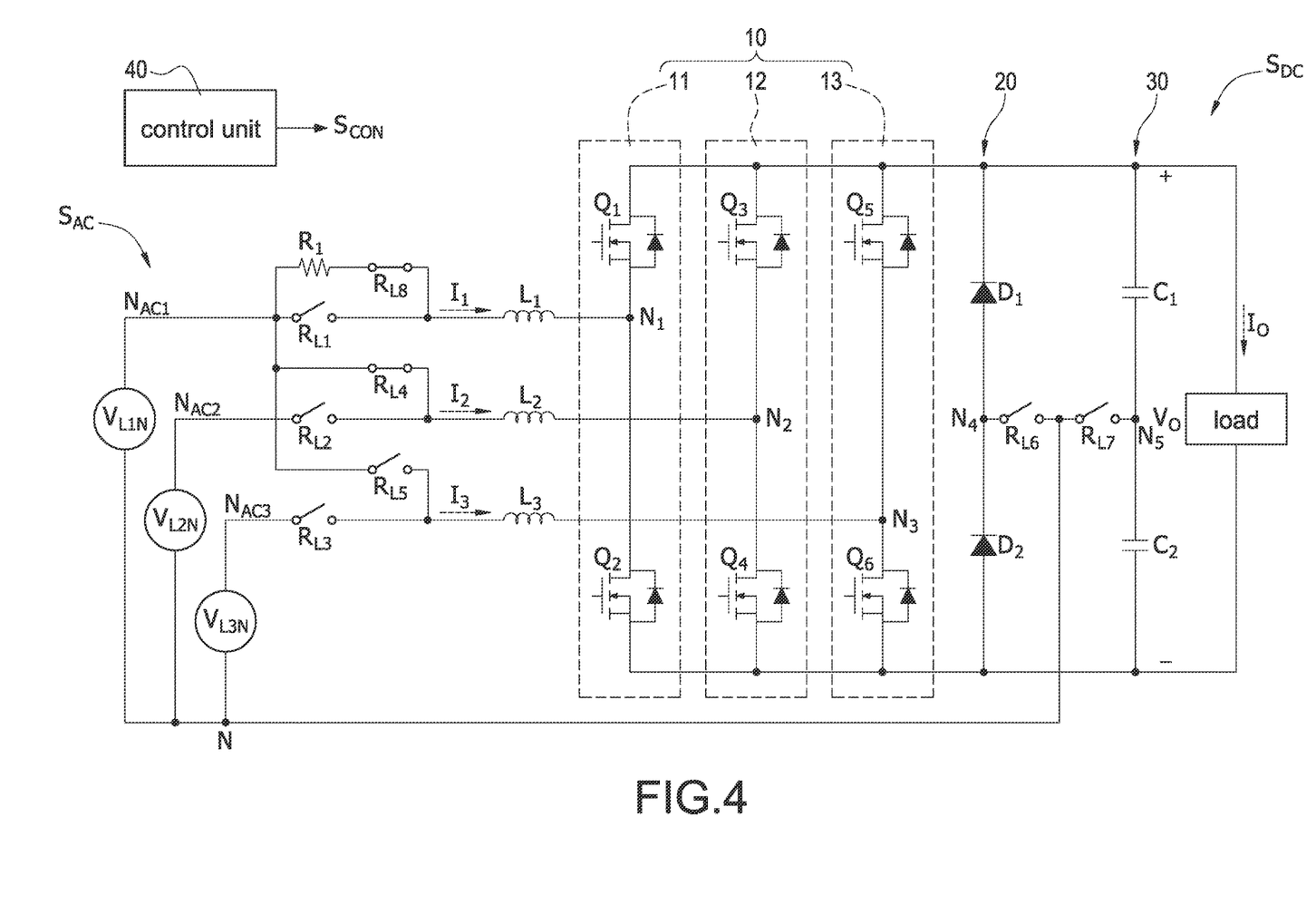
FIG. 4 is a circuit diagram of states of switching components when the single-phase and three-phase compatible AC-DC conversion circuit operating under a discharging according to the present disclosure.

As shown in FIG. 4, which shows a circuit diagram of states of switching components when the single-phase and three-phase compatible AC-DC conversion circuit operating under a discharging according to the present disclosure.

Figure 5:
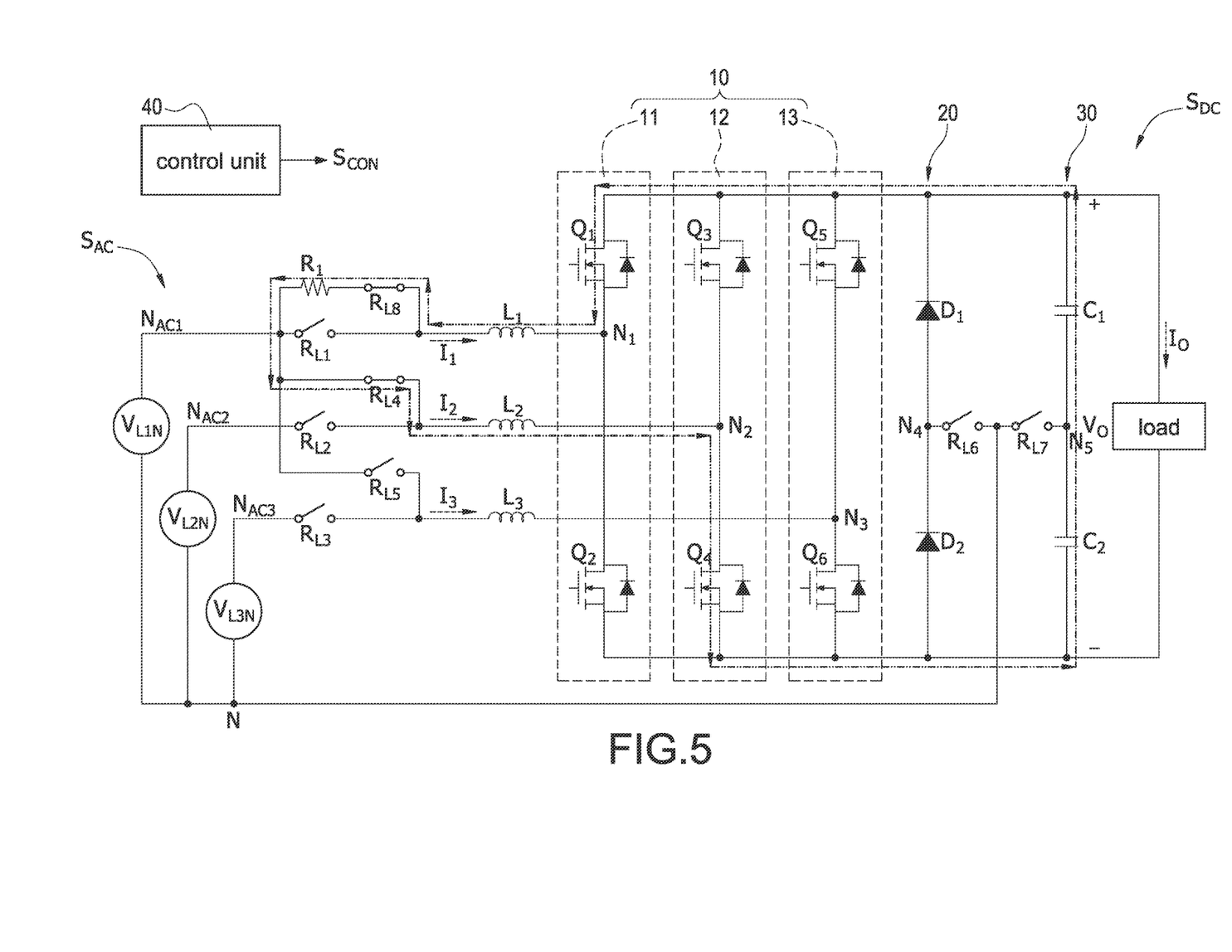
FIG. 5 is a circuit diagram of current paths when the single-phase and three-phase compatible AC-DC conversion circuit operating under a discharging according to the present disclosure.

Afterward, the discharge operation is activated. Please refer to FIG. 5, which shows a circuit diagram of current paths when the single-phase and three-phase compatible AC-DC conversion circuit operating under a discharging according to the present disclosure. At this condition, the eighth switching component $RL_8$ and the fourth switching component $RL_4$ are turned on, and further the first switch $Q_1$ of the first switch bridge arm 11 and the fourth switch $Q_4$ of the second switch bridge arm 12 are turned on. Further, pulse width modulation (PWM) can be used to change/adjust the duty cycle of the power switching component in time so that the power capacitors (the first capacitor C1 and the second capacitor $C_2$) may be discharged by the pre-charge resistor $R_1$. In particular, the discharge path is shown in the direction of the arrow shown in FIG. 5, that is, the discharge path of the capacitor assembly 30 is provide (implemented) by turning on the fourth switching component $RL_4$, the eighth switching component $RL_8$, the first switch $Q_1$, and the fourth switch $Q_4$ by the control unit 40. Therefore, the discharge path of the capacitor assembly 30 is formed by the first switch $Q_1$, the eighth switching component $RL_8$, the pre-charge resistor $R_1$, the fourth switching component $RL_4$, and the fourth switch $Q_4$. In particular, the eighth switching component $RL_8$ may be omitted and replaced by a short circuit, and therefore the discharge path does not include the eighth switching component $RL_8$. The control of the duty cycle ratio and the switching frequency of the switch will directly affect the magnitude of the discharging current. Therefore, the discharging current can be suppressed by controlling the duty cycle ratio and the switching frequency of the switch.

Finally, when the voltage of the power capacitors (i.e., the first capacitor C1 and the second capacitor $C_2$) is discharged to a safe voltage range (is also referred to as "safe operating area (SOA)"), the strategy of the active switch modulation finishes. At this condition, the first switch $Q_1$ and the fourth switch $Q_4$ are turned off, and the remaining switching components (including the eighth switching component $RL_8$ and the fourth switching component $RL_4$) are turned off. Therefore, the states of the switches and switching components of the entire circuit are shown in FIG. 1, and the voltage of the power capacitor is slowly and continuously discharged.

Incidentally, the previously disclosed AC-DC conversion circuit is only one embodiment, and not every component must be present, and therefore the power conversion circuit may have different implementations. Take FIG. 1 as an example, when the single-phase operation does not require too much power application, the fifth switching component $RL_5$ may be omitted. Alternatively, the diode bridge arm 20, the sixth switching component $RL_6$, and the seventh switching component $RL_7$ may be omitted. In addition, the fifth node $N_5$ is directly connected to the neutral node N so that both single-phase operation and three-phase operation use the operation of half-bridge power factor correction circuit. In particular, under the single-phase operation, the AC input is connected to two bridge arms, and under the three-phase operation, the AC input is correspondingly connected to each phase bridge arm. Therefore, the main spirit of the present disclosure is to use the switching component to achieve a charging operation compatible with single-phase and three-phase AC input, and after the charging is completed, the switches of the bridge arms, the switching components, and the pre-charge resistor are used to form a discharge circuit to discharge the capacitor.

Figure 6:
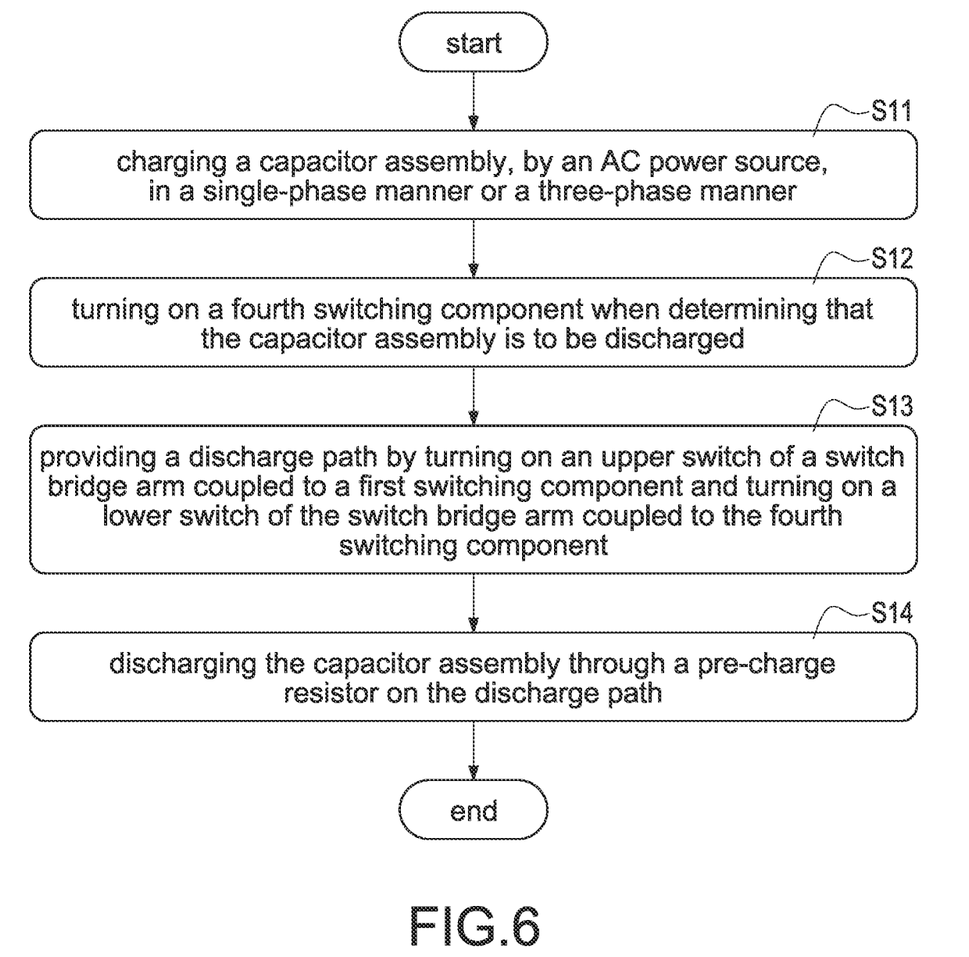
FIG. 6 is a flowchart of a method of controlling charge and discharge of a single-phase and three-phase compatible AC-DC conversion circuit according to the present disclosure.

Please refer to FIG. 6, which shows a flowchart of a method of controlling charge and discharge of a single-phase and three-phase compatible AC-DC conversion circuit according to the present disclosure. The AC-DC conversion circuit includes three switch bridge arms, the fourth switching component, the pre-charge resistor, and the capacitor assembly. Each switch bridge arm includes the upper switch and the lower switch connected in series. The plurality of common-connected nodes of the upper switches and the corresponding lower switches are respectively coupled to the AC power source through the first switching component, the second switching component, and the third switching component. The fourth switching component is coupled between a first phase of the AC power source and a common-connected node of the switch bridge arm corresponding to a second phase of the AC power source. The pre-charge resistor is coupled to the first switching component in parallel. The capacitor assembly is coupled to each of the switch bridge arms in parallel.

The method of controlling charge and discharge includes the following steps of: first, charging the capacitor assembly, by the AC power source, in a single-phase manner or a three-phase manner (S11). Afterward, turning on the fourth switching component when determining that the capacitor assembly is to be discharged (S12). Afterward, providing a discharge path by turning on the upper switch of the switch bridge arm coupled to the first switching component and turning on the lower switch of the switch bridge arm coupled to the fourth switching component (S13). Afterward, discharging the capacitor assembly through the pre-charge resistor on the discharge path (S14).

Incidentally, the charge and discharge control method provided by the present disclosure may correspond to the operation of the single-phase and three-phase compatible AC-DC conversion circuit disclosed previously. Therefore, the specifics and details of the control method may be found in the corresponding specification, and the detail description is omitted here for conciseness.

In summary, the present disclosure has the following features and advantages:

1. The existing pre-charge circuit structure is used for charging operation, only the original power switch components and the pre-charging resistor $R_1$ may be used to realize the active discharging function, and therefore no additional components are needed, which can save the circuit cost and reduce the circuit size.

2. The power switch components inside the on-board charger is cooperated with the pre-charge resistor $R_1$, which can quickly discharge the voltage of the power capacitors (i.e., the first capacitor C1 and the second capacitor $C_2$) to a safe voltage range (i.e., a safe operating are (SOA)) to increase the operational safety of users and maintenance technicians.

3. In order to prevent the large current generated by the power switching component from damaging its own component and the pre-charge resistor $R_1$, the pulse width modulation (PWM) is introduced to optimize in time and adjust the duty cycle of power switching components, namely, a ratio between turned-on time and turned-off time. Therefore, it not only can effectively reduce the current stress of the power switching components, but also improve the tolerance and system reliability of the power switching components.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A single-phase and three-phase compatible AC-DC conversion circuit, disposed between an AC side and a DC side, the AC side comprising a three-phase power source, the AC-DC conversion circuit comprising:
a first switching component, a second switching component, and a third switching component,
a switch bridge arm assembly, comprising:
three switch bridge arms, each of the switch bridge arms comprising an upper switch and a lower switch connected in series; a plurality of common-connected nodes between the upper switches and the corresponding lower switches respectively coupled to the three-phase power source through the first switching component, the second switching component, and the third switching component,
a fourth switching component, coupled between a first phase of the three-phase power source and the common-connected node of the switch bridge arm corresponding to a second phase of the three-phase power source,
a pre-charge resistor, coupled to the first switching component in parallel,
a capacitor assembly, coupled to the switch bridge arm assembly in parallel to form the DC side, and
a control unit, configured to turn on the fourth switching component, turn on the upper switch of the switch bridge arm coupled to the first switching component, and turn on the lower switch of the switch bridge arm coupled to the fourth switching component to provide a discharge path so that the capacitor assembly discharges through the pre-charge resistor on the discharge path.

2. The single-phase and three-phase compatible AC-DC conversion circuit as claimed in claim 1, further comprising:
a fifth switching component, coupled between the first phase of the three-phase power source and the common-connected node of the switch bridge arm corresponding to a third phase of the three-phase power source.

3. The single-phase and three-phase compatible AC-DC conversion circuit as claimed in claim 2, wherein the switch bridge arms comprise:
a first switch bridge arm, comprising a first switch and a second switch coupled to the first switching component,
a second switch bridge arm, comprising a third switch and a fourth switch coupled to the second switching component, and
a third switch bridge arm, comprising a fifth switch and a sixth switch coupled to the third switching component,
wherein the control unit turns on the first switching component, the fourth switching component, and fifth switching component, activates the first switch bridge arm, the second switch bridge arm, and the third switch bridge arm so that the first phase of the three-phase power source charges the capacitor assembly.

4. The single-phase and three-phase compatible AC-DC conversion circuit as claimed in claim 1, further comprising:
a diode bridge arm, coupled to the switch bridge arm assembly in parallel,
a sixth switching component, coupled to the diode bridge arm, and
a seventh switching component, coupled to the sixth switching component and a neutral node of the three-phase power source.

5. The single-phase and three-phase compatible AC-DC conversion circuit as claimed in claim 1, further comprising:
an eighth switching component, coupled to the pre-charge resistor in series to form a series-connected structure, and the series-connected structure coupled to the first switching component in parallel.

6. The single-phase and three-phase compatible AC-DC conversion circuit as claimed in claim 5, wherein the switch bridge arms comprise:
a first switch bridge arm, comprising a first switch and a second switch coupled to the first switching component,
a second switch bridge arm, comprising a third switch and a fourth switch coupled to the second switching component, and
a third switch bridge arm, comprising a fifth switch and a sixth switch coupled to the third switching component,
wherein the control unit turns on the fourth switching component and the eighth switching component, turns on the first switch and the fourth switch so that the capacitor assembly discharges through the pre-charge resistor.

7. The single-phase and three-phase compatible AC-DC conversion circuit as claimed in claim 1, wherein the switch bridge arms comprise:
a first switch bridge arm, comprising a first switch and a second switch coupled to the first switching component,
a second switch bridge arm, comprising a third switch and a fourth switch coupled to the second switching component, and
a third switch bridge arm, comprising a fifth switch and a sixth switch coupled to the third switching component,
wherein the control unit turns on the fourth switching component, turns on the first switch and the fourth switch so that the capacitor assembly discharges through the pre-charge resistor.

8. The single-phase and three-phase compatible AC-DC conversion circuit as claimed in claim 1, wherein the switch bridge arms comprise:
a first switch bridge arm, comprising a first switch and a second switch coupled to the first switching component,
a second switch bridge arm, comprising a third switch and a fourth switch coupled to the second switching component, and
a third switch bridge arm, comprising a fifth switch and a sixth switch coupled to the third switching component,
wherein the control unit turns on the first switching component and the fourth switching component, activates the first switch bridge arm and the second switch bridge arm so that the first phase of the three-phase power source charges the capacitor assembly.

9. The single-phase and three-phase compatible AC-DC conversion circuit as claimed in claim 1, wherein the switch bridge arms comprise:
   a first switch bridge arm, comprising a first switch and a second switch coupled to the first switching component,
   a second switch bridge arm, comprising a third switch and a fourth switch coupled to the second switching component, and
   a third switch bridge arm, comprising a fifth switch and a sixth switch coupled to the third switching component,
   wherein the control unit turns on the first switching component, the second switching component, and third switching component, actives the first switch, the second switch, the third switch, the fourth switch, the fifth switch, and the sixth switch so that the three-phase power source charges the capacitor assembly.

10. A method of controlling charge and discharge of a single-phase and three-phase compatible AC-DC conversion circuit, the AC-DC conversion circuit configured to receive an AC power source, and the AC-DC conversion circuit comprising three switch bridge arms, a fourth switching component, a pre-charge resistor, and a capacitor assembly; each of the switch bridge arms comprising an upper switch and a lower switch connected in series; a plurality of common-connected nodes between the upper switches and the corresponding lower switches respectively coupled to the AC power source through a first switching component, a second switching component, and a third switching component; the fourth switching component coupled between a first phase of the three-phase power source and the common-connected node of the switch bridge arm corresponding to a second phase of the three-phase power source; the pre-charge resistor coupled to the first switching component in parallel; the capacitor assembly coupled to the three switch bridge arms in parallel; the method comprising steps of:
   (a) charging the capacitor assembly, by the AC power source, in a single-phase manner or a three-phase manner,
   (b) turning on the fourth switching component when determining that the capacitor assembly is to be discharged,
   (c) providing a discharge path by turning on the upper switch of the switch bridge arm coupled to the first switching component and turning on the lower switch of the switch bridge arm coupled to the fourth switching component, and
   (d) discharging the capacitor assembly through the pre-charge resistor on the discharge path.

11. The method as claimed in claim 10, wherein the AC-DC conversion circuit further comprises:
   an eighth switching component, coupled to the pre-charge resistor in series to form a series-connected structure, and the series-connected structure coupled to the first switching component in parallel,
   wherein in the step (b), further comprising a step of: turning on the eighth switching component.

12. The method as claimed in claim 10, wherein in the step (a), the AC power source charges the capacitor assembly in the three-phase manner by turning on the first switching component, the second switching component, the third switching component, and activating the corresponding upper switch and lower switch.

13. The method as claimed in claim 10, wherein in the step (a), the AC power source charges the capacitor assembly in the single-phase manner by turning on the first switching component and the fourth switching component, and activating the corresponding upper switch and lower switch.

14. The method as claimed in claim 10, wherein the AC-DC conversion circuit further comprises a fifth switching component,
   in the step (a), turning on the first switching component, the fourth switching component, and the fifth switching component so that the three switch bridge arms are commonly coupled to one phase of the AC power source to charge the capacitor assembly.

* * * * *